United States Patent
Levy-Abegnoli et al.

(10) Patent No.: US 10,911,400 B2
(45) Date of Patent: Feb. 2, 2021

(54) NETWORK DEVICE MOVEMENT VALIDATION

(71) Applicant: Cisco Technology, Inc., San Jose, CA (US)

(72) Inventors: Eric Levy-Abegnoli, Valbonne (FR); Patrick Wetterwald, Mouans Sartoux (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 15/156,571

(22) Filed: May 17, 2016

(65) Prior Publication Data
US 2017/0339099 A1 Nov. 23, 2017

(51) Int. Cl.
| | |
|---|---|
| *G06F 15/16* | (2006.01) |
| *H04L 29/12* | (2006.01) |
| *H04L 29/08* | (2006.01) |
| *G06F 16/951* | (2019.01) |
| *H04W 4/70* | (2018.01) |

(52) U.S. Cl.
CPC ........ *H04L 61/2007* (2013.01); *G06F 16/951* (2019.01); *H04L 61/6022* (2013.01); *H04L 61/6059* (2013.01); *H04L 67/18* (2013.01); *H04W 4/70* (2018.02)

(58) Field of Classification Search
CPC ............. H04L 61/2007; H04L 61/6022; H04L 61/6059; H04L 67/18; G06F 17/30864
USPC ......................................... 709/245–248, 217
See application file for complete search history.

(56) References Cited

U.S. PATENT DOCUMENTS

| | | | |
|---|---|---|---|
| 2003/0185172 A1* | 10/2003 | Rue ................... | H04L 29/12028 370/331 |
| 2005/0088994 A1* | 4/2005 | Maenpaa .............. | H04W 60/00 370/331 |
| 2006/0018466 A1* | 1/2006 | Adelstein ............ | H04L 63/1425 380/46 |

(Continued)

OTHER PUBLICATIONS

Jara, Antonio J., Miguel A. Zamora, and Antonio FG Skarmeta. "Intra-mobility for hospital wireless sensor networks based on 6LoWPAN." In Wireless and Mobile Communications (ICWMC), 2010 6th International Conference on, pp. 389-394. IEEE, 2010.*

(Continued)

*Primary Examiner* — Cheikh T Ndiaye
*Assistant Examiner* — Melaku Y Habtemariam
(74) *Attorney, Agent, or Firm* — Behmke Innovation Group LLC; James M. Behmke; James J. Wong

(57) ABSTRACT

In one embodiment, a tracking device detects a first device connecting to a computer network, and forces an install of fake routing information on the first device that is unique to the first device. Upon detecting a second device connecting to the computer network, the second device having at least one identifying property in common with the first device and at least one identifying property differing from the first device, the tracking device may then query the second device to determine if the second device knows the fake routing information unique to the first device. As such, the tracking device may then determine that the second device is the first device in response to the second device knowing the fake routing information unique to the first device.

20 Claims, 7 Drawing Sheets

(56) References Cited

U.S. PATENT DOCUMENTS

| | | | | |
|---|---|---|---|---|
| 2010/0215019 A1* | 8/2010 | Velev | .................. | H04W 8/06 |
| | | | | 370/331 |
| 2013/0291117 A1* | 10/2013 | Thubert | .............. | H04L 63/1458 |
| | | | | 726/26 |
| 2014/0006585 A1* | 1/2014 | Dunbar | ................... | H04L 41/00 |
| | | | | 709/223 |
| 2014/0283029 A1* | 9/2014 | Chandrasekaran | ..... | H04L 63/14 |
| | | | | 726/22 |

OTHER PUBLICATIONS

Huitema, C., "Experience with MAC Address Randomization in Windows 10", IETF 93, Jul. 2015, 6 pages, Prague.

* cited by examiner

NETWORK DEVICE MOVEMENT VALIDATION

TECHNICAL FIELD

The present disclosure relates generally to computer networks, and, more particularly, to network device movement validation.

BACKGROUND

Although network devices have traditionally maintained an unchanging media access control (MAC) address, certain devices today (and more so in the future) have the ability to changes their MAC address, such as, for example, each time the device roams from one Wi-Fi access point (AP) to another. This may be due to non-traceability and/or privacy reasons, and may occur even if the device is not roaming or moving.

With the growth of the Internet of Things (IoT), in particular, these changing and mobile devices will cause real problems to routing protocols. For instance, in network switching products, the MAC address of the attached device is the keystone of layer-2 domain operations, being securely bound with authentication tokens, cached in switches and in the mapping system for rapid localization, tracked for efficient mobility management, stored and verified to provide better security (port security, First Hop Security, MAC-to-IP binding security, and many more features). Losing this information may jeopardize many of the security and management features, and disrupt layer-2 operations, at a time where scaling and performance are getting absolutely critical.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
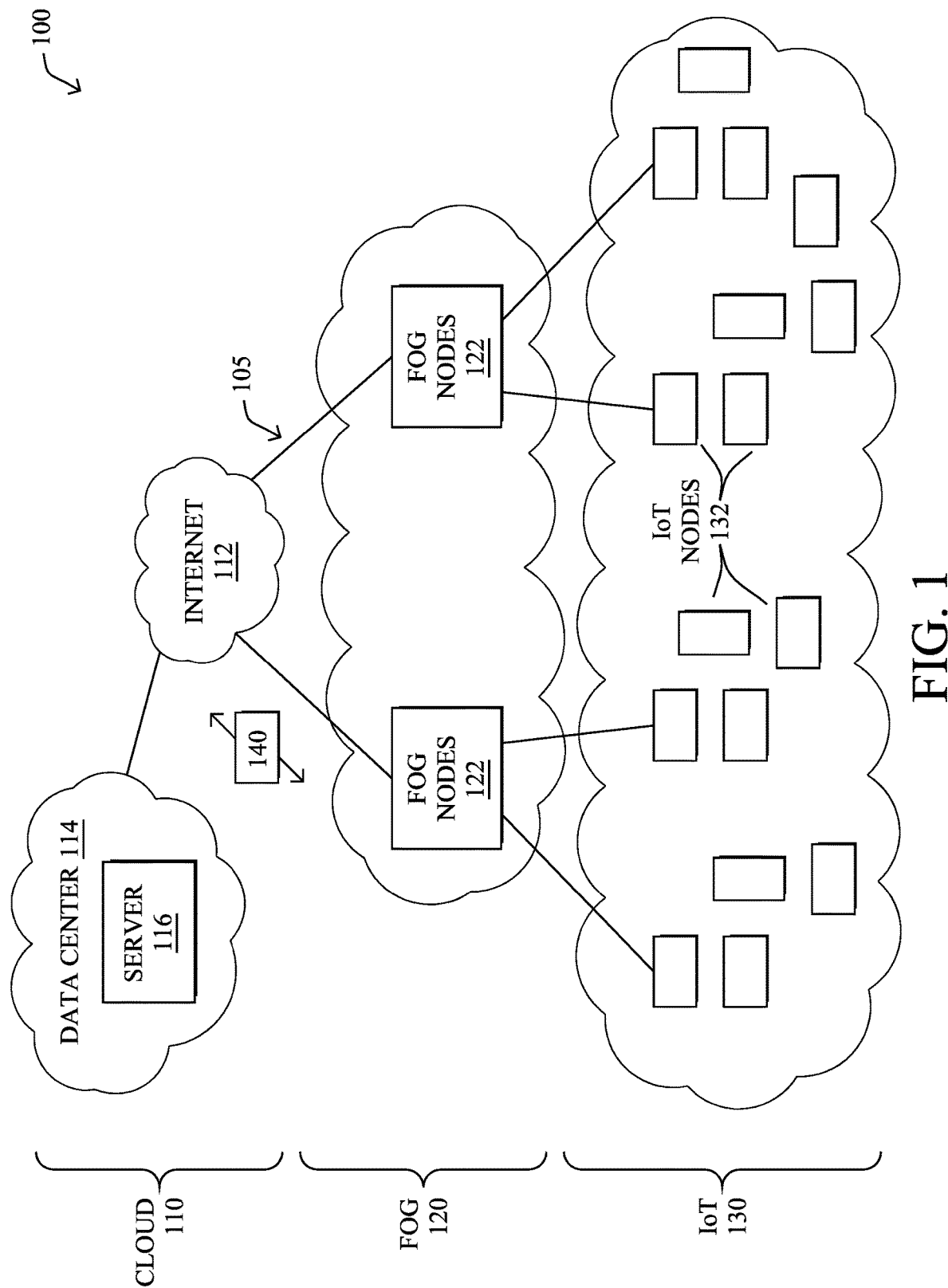
FIG. 1 illustrates an example communication network.

According to one or more embodiments of the disclosure, a tracking device detects a first device connecting to a computer network, and forces an install of fake routing information on the first device that is unique to the first device. Upon detecting a second device connecting to the computer network, the second device having at least one identifying property in common with the first device and at least one identifying property differing from the first device, the tracking device may then query the second device to determine if the second device knows the fake routing information unique to the first device. As such, the tracking device may then determine that the second device is the first device in response to the second device knowing the fake routing information unique to the first device.

According to one or more additional embodiments of the disclosure, in response to detecting a first device with an anchor address connected to the tracking device, the tracking device i) stores the anchor address in a tracking database with a variable address and location of the first device bound to the anchor address in the tracking database; ii) builds a unique address for the first device; and iii) sends a neighbor solicitation (NS) lookup message to the first device, the NS lookup message sourced with the unique address for the first device with a source link-layer address (SLLA) option, the NS lookup message also having a variable address defined by the tracking device, wherein the first device is configured to enter the unique address and the variable address in a neighbor discovery database of the first device. Accordingly, in response to detecting a second device with the anchor address connected to the tracking device, the tracking device i) sends an NS neighbor unreachability detection (NUD) query to the second device, the NS NUD query sourced with the unique address for the first device without an SLLA option; ii) determines the second device is the first device in response to the second device responding to the query with a neighbor advertisement (NA) message for the unique address for the first device; and iii) determines the second device is not the first device in response to the second device requesting address resolution for the unique address for the first device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or power-line communication (PLC) networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links 105 may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130 (note that "fog" may be considered part of the IoT network 130, such that portion 130 refers more specifically to the "things" or "intelligent things", i.e., devices). Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices/nodes 122 may execute various fog computing resources on network edge devices, as opposed to datacenter/cloud-based servers or on the endpoint nodes 132 themselves of the IoT layer 130. Data packets 140 (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, particularly as a network with cloud, fog, and IoT layers, the network 100 is merely an example illustration that is not meant to limit the disclosure. Moreover, the techniques herein may be applied at any suitable location of a computer network, such as at the edge of a network (e.g., wireless access points (APs), field area routers (FARs), cellular networks), the core of the network (e.g., service provider devices, data center servers), or anywhere in between. In particular, as described below, any device/node shown in the network 100 may be configured to operate as a "network device", a "device", a "connecting device," a "routing device", a "tracking device", and so on, since the techniques herein are applicable to any arrangement of devices that may be configured to move/change and/or to validate that movement/change, accordingly.

Figure 2:
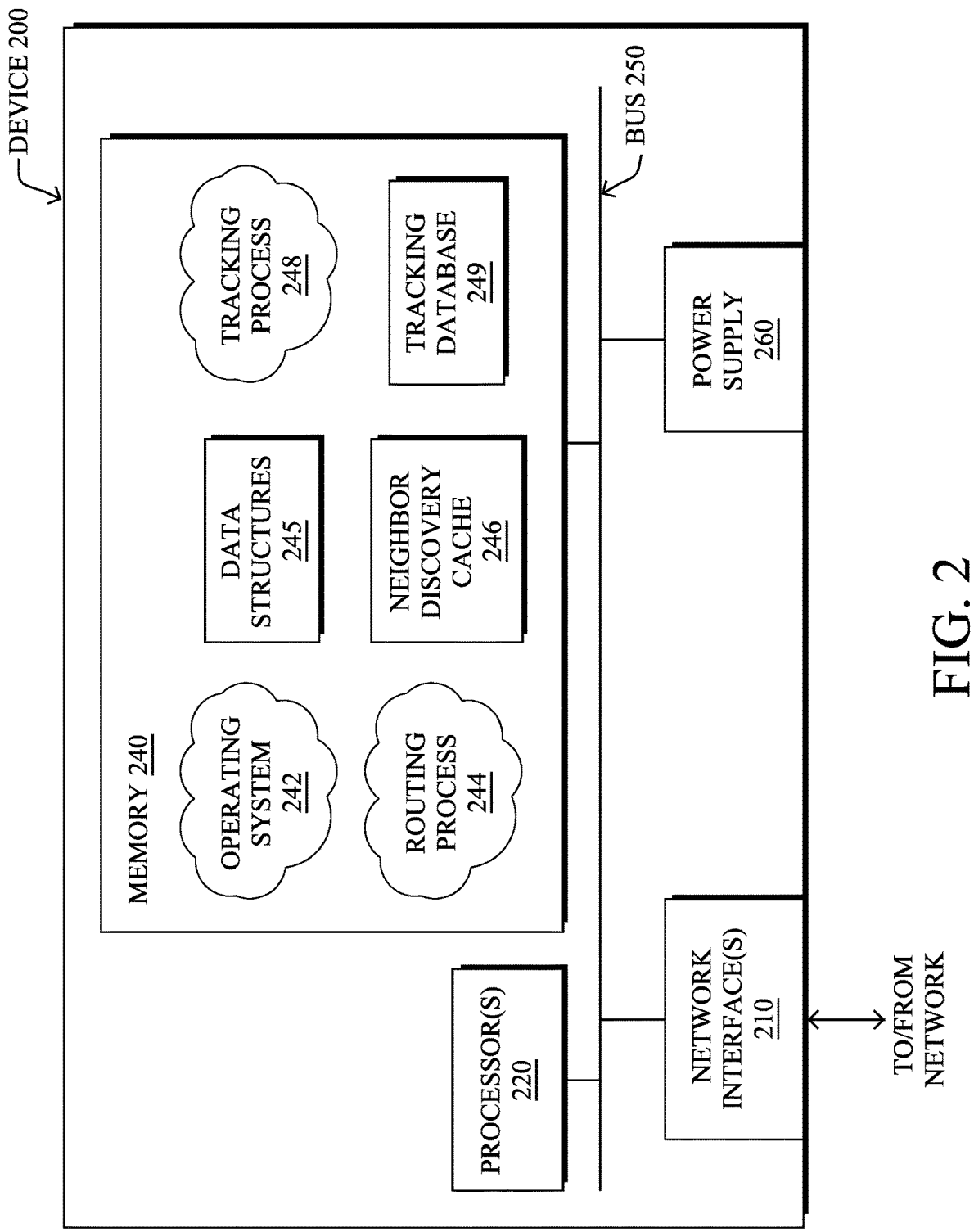
FIG. 2 illustrates an example network device.

FIG. 2 is a schematic block diagram of an example node/device 200 that may be used with one or more embodiments described herein, e.g., as any of the devices/nodes shown in FIG. 1 above. The device may comprise one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for devices using power-line communication (PLC) or Power over Ethernet (PoE), the network interface 210 may communicate through the power supply 260, or may be an integral component of the power supply. In some specific configurations the PLC/PoE signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245, such as an illustrative neighbor discovery (ND) cache 246 and/or a tracking database 249. An operating system 242, portions of which are typically resident in memory 240 and executed by the processor, functionally organizes the device by, among other things, invoking operations in support of software processes and/or services executing on the device. These software processes and/or services may comprise routing process/services 244, and on configured tracking devices (described below) an illustrative tracking process 248, as described herein. Note that while dynamic routing process 244 and tracking process 248 are shown in centralized memory 240, alternative embodiments provide for one or both of the processes to be specifically operated within the network interfaces 210, such as a component of a MAC layer).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions, as will be understood by those skilled in the art.

An example sub-process within routing process 244 is the neighbor discovery protocol (NDP), which, as outlined in the Internet Engineering Task Force (IETF) request for comments (RFC) 4861, states that a routing device should create a neighbor discovery (ND) cache entry for requested addresses, and keep the entries for some time (e.g., a few hours). In addition, the illustrative NDP also requires that the router multicast neighbor solicitation (NS) messages for each of the addresses that were not originally in the ND cache 246 of the device.

Generally, and as will be understood by those skilled in the art, the functional applications of NDP include:
Router discovery;
Auto-configuration of addresses, e.g., stateless address auto-configuration (SLAAC)
IPv6 address resolution, e.g., replacing Address Resolution Protocol (ARP) (note that the acronym ARP herein may simply refer to both IPv6 address resolution and the Address Resolution Protocol);
Neighbor reachability, e.g., neighbor unreachability detection (NUD);
Duplicate address detection (DAD); and
Redirection.

As noted above, although network devices have traditionally maintained an unchanging media access control (MAC) address, certain devices today (and more so in the future) have the ability to changes their MAC address, such as, for example, each time the device roams from one Wi-Fi access point (AP) to another. This may be due to non-traceability and/or privacy reasons, and may occur even if the device is not roaming or moving.

As also noted above, with the growth of the IoT, in particular, these changing and mobile devices will cause real problems to routing protocols. For instance, in network switching products, the MAC address of the attached device is the keystone of layer-2 domain operations, being securely bound with authentication tokens, cached in switches and in the mapping system for rapid localization, tracked for efficient mobility management, stored and verified to provide better security (port security, First Hop Security, MAC-to-IP binding security, and many more features). Losing this information may jeopardize many of the security and management features, and disrupt layer-2 operations, at a time where scaling and performance are getting absolutely critical.

Managing IoT device mobility (e.g., in an industrial environment, in a campus, for connected cars, etc.) has become an important problem to address. In addition, the features above may bring rise to attackers that will force the change of MAC addresses and their attachment point to the network in order not to be identified.

—Network Device Movement Validation—

Accordingly, the techniques herein identify when a device changes its MAC (or IP) address, and determine the new MAC (or IP) address the device is now using. In addition, a tracking device may match the new and the old addresses, so that it can transfer all states throughout the layer-2 domain and preserve localization, mobility, and security. Said differently, example embodiments of the techniques herein provide a method that illustratively uses ND to place a cookie in the devices attached to the network so that the tracking device (e.g., the device to which the tracked device is attached, such as a switch) can track a device that changes its IP or its MAC address. The cookie may be a pre-resolved address that can be installed by an NS-lookup flow originated from the tracking device. In one embodiment, a shared IPv6 address may be placed in the caches of all devices, but with a different MAC address per device, and that MAC address may then be used as destination to the packets to the shared IPv6 to thus identify the device.

Specifically, according to one or more embodiments of the disclosure as described in detail below, a tracking device detects a first device connecting to a computer network, and forces an install of fake routing information on the first device that is unique to the first device. Upon detecting a second device connecting to the computer network, the second device having at least one identifying property in common with the first device and at least one identifying property differing from the first device, the tracking device may then query the second device to determine if the second device knows the fake routing information unique to the first device. As such, the tracking device may then determine that the second device is the first device in response to the second device knowing the fake routing information unique to the first device.

Also, in one specific example embodiment described in detail below, in response to detecting a first device with an anchor address connected to the tracking device, the tracking device i) stores the anchor address in a tracking database with a variable address and location of the first device bound to the anchor address in the tracking database; ii) builds a unique address for the first device; and iii) sends a neighbor solicitation (NS) lookup message to the first device, the NS lookup message sourced with the unique address for the first device with a source link-layer address (SLLA) option, the NS lookup message also having a variable address defined by the tracking device, wherein the first device is configured to enter the unique address and the variable address in a neighbor discovery database of the first device. Accordingly, in response to detecting a second device with the anchor address connected to the tracking device, the tracking device i) sends an NS neighbor unreachability detection (NUD) query to the second device, the NS NUD query sourced with the unique address for the first device without an SLLA option; ii) determines the second device is the first device in response to the second device responding to the query with a neighbor advertisement (NA) message for the unique address for the first device; and iii) determines the second device is not the first device in response to the second device requesting address resolution for the unique address for the first device.

Illustratively, the techniques described herein may be performed by hardware, software, and/or firmware, such as in accordance with the tracking process 248, which may contain computer executable instructions executed by the processor 220 to perform functions relating to the techniques described herein, e.g., in conjunction with routing process 244. For example, the techniques herein may be treated as extensions or compliments to conventional protocols, such as the neighbor discovery protocol (NDP), and as such, may be processed by similar components understood in the art that execute those protocols, accordingly.

Operationally, for a device to be discovered by the tracking system, it usually takes some traffic to be snooped. Illustratively, this traffic can be control traffic, IPv4 or IPv6 (ARP, IPv6 ND NS, Dynamic Host Configuration Protocol (DHCP)) or some data packet that this device sent. The anchor address (the device's consistent identity) can be either its IP address or its MAC address. In the context of the embodiments herein, it does not matter which one is used, and all of them are subject to be renewed (e.g., for privacy reasons). The techniques herein are hereinafter described assuming the IP address "$IP_U$" is the anchor address, and the MAC address is a variable address, but the techniques are equally applicable in the reverse.

Upon detecting a new IP address connected to the tracking device (which may be, illustratively, a switch), the tracking system (which may be on the switch, or may be remotely located, such as on a remote server) will store that new address in the tracking database 249, and bind it to the MAC and location of the device.

At the same time, the tracking device will build a unique address (e.g., an IPv6 address, since it offers a very large IP address space to do this), then $IP_{UU}=f(IP_U)$. It will send a particular IPv6 neighbor discovery (ND) message, a neighbor solicitation (NS) lookup, sourced with $IP_{UU}$ with a source link-layer address (SLLA) option. As will be understood in the art, the SLLA option generally contains the link-layer (e.g., MAC) address of the interface from which the advertisement is sent (and as described below, omitting the SLLA option from advertisement packets forces neighbors to use Neighbor Solicitation messages to learn link-layer addresses of routers). The goal of the NS lookup message is to force an entry into the connecting device's ND cache 246, so that it knows up-front the MAC address of $IP_{UU}$.

Figure 3:
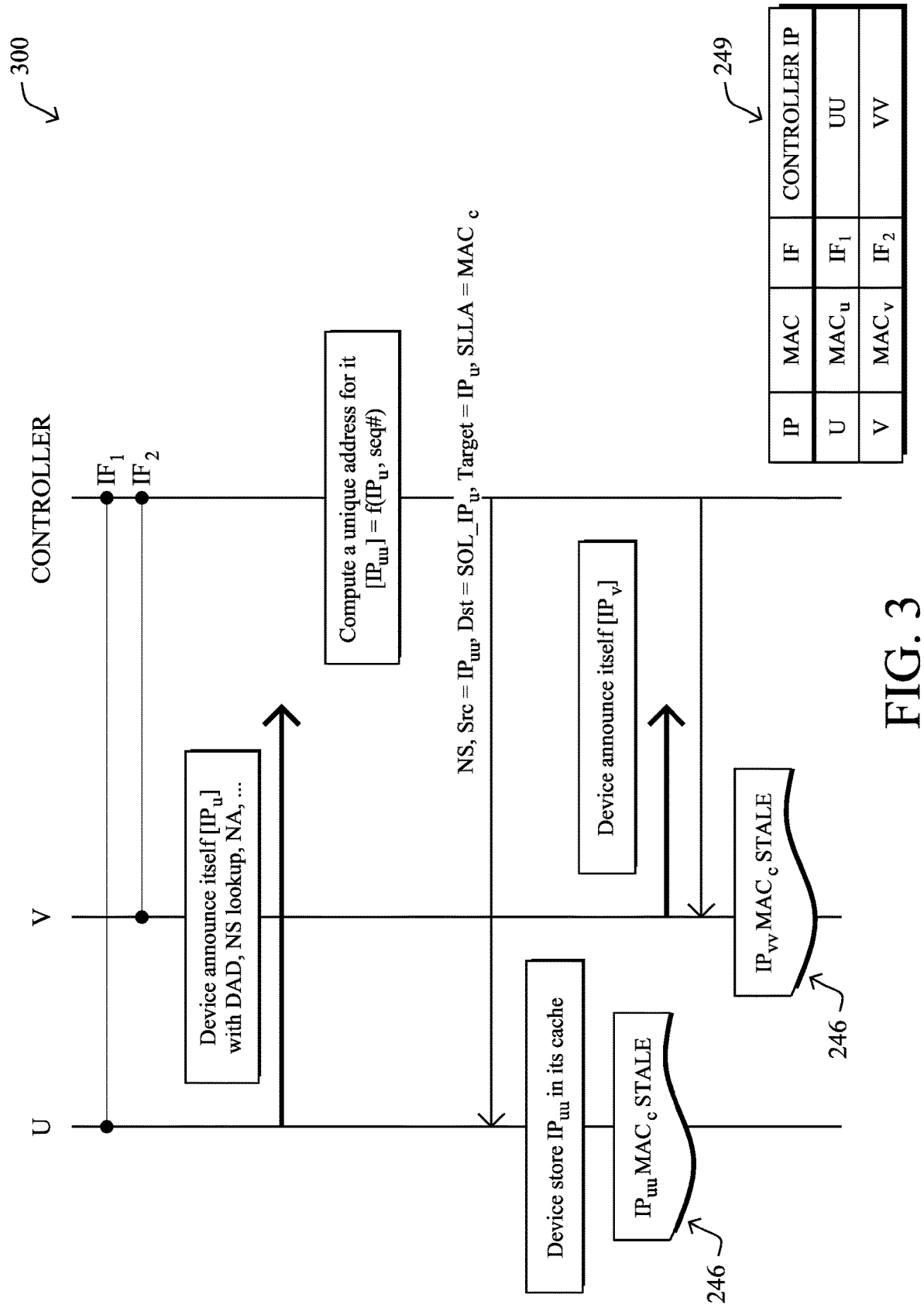
FIG. 3 illustrates an example setup for network device movement validation.

FIG. 3 illustrates an example connectivity and messaging timeline 300 (e.g., setup of the system herein), where a devices "U" and "V" connect to a tracking device or "controller" on respective interfaces $IF_1$ and $IF_2$. As shown, device U announces itself as $IP_U$ (e.g., using DAD, NS lookup, neighbor advertisement (NA), etc.). The controller computes a unique address for the device as $IP_{UU}$, which may be a function of $IP_U$ and may comprise a sequence number (for further tracking purposes). The controller stores this information in its tracking database 249, then returns an NS lookup message, sourced with $IP_{UU}$, where the destination and target of the NS lookup message is the original $IP_U$, and the SLLA option is populated with a MAC defined by the controller (e.g., $MAC_C$), which may be the MAC of the controller or other MAC, as defined herein. Accordingly, the first device U stores the $IP_{UU}$ in its ND cache 246, along with the $MAC_C$. Notably, the state of the entry may be set to STALE, as will be appreciated by those skilled in the art. The same sequence may generally occur for other devices (e.g., device V), as shown (e.g., $IP_V$ and $IP_{VV}$, and so on).

Notably, each new device ($IP_V$ for instance) will be "bound" (tainted) with a different unique address, neither an IP address nor a MAC address, neither of which really exist in the network. That is, this unique address is really owned by the tracking system, but each device has a unique entry in its cache corresponding to the address that was bound to him. In particular, $IP_{UU}$ (and $IP_{VV}$, etc.) addresses are not assigned on devices, but rather are generated and defended by the tracking device (typically a first connected switch/access point, etc.) and simply "pushed" to the device as a "cookie", i.e., an address pushed into the ND cache of the device, which may then be read indirectly, as described below (e.g., by analyzing the device behavior—such as by not trying the resolve the IP which is already in the ND cache). On the tracking device/switch, there is one IP address per device, which is possible because of the plethora of IPv6 addresses. Accordingly, the unique address is invariant because it is owned by the tracking device, not the connecting (e.g., IoT) device.

According to one or more of the embodiments herein, when the device moves to another location, and is detected again by the tracking device at the new location, or when it changes its MAC, and using the same IP (for instance $IP_U$), the tracking system will detect it by the usual methods. Then, since the MAC changed, or the location changed, the tracking system needs to validate it is the same (U) device as before.

Figure 4:
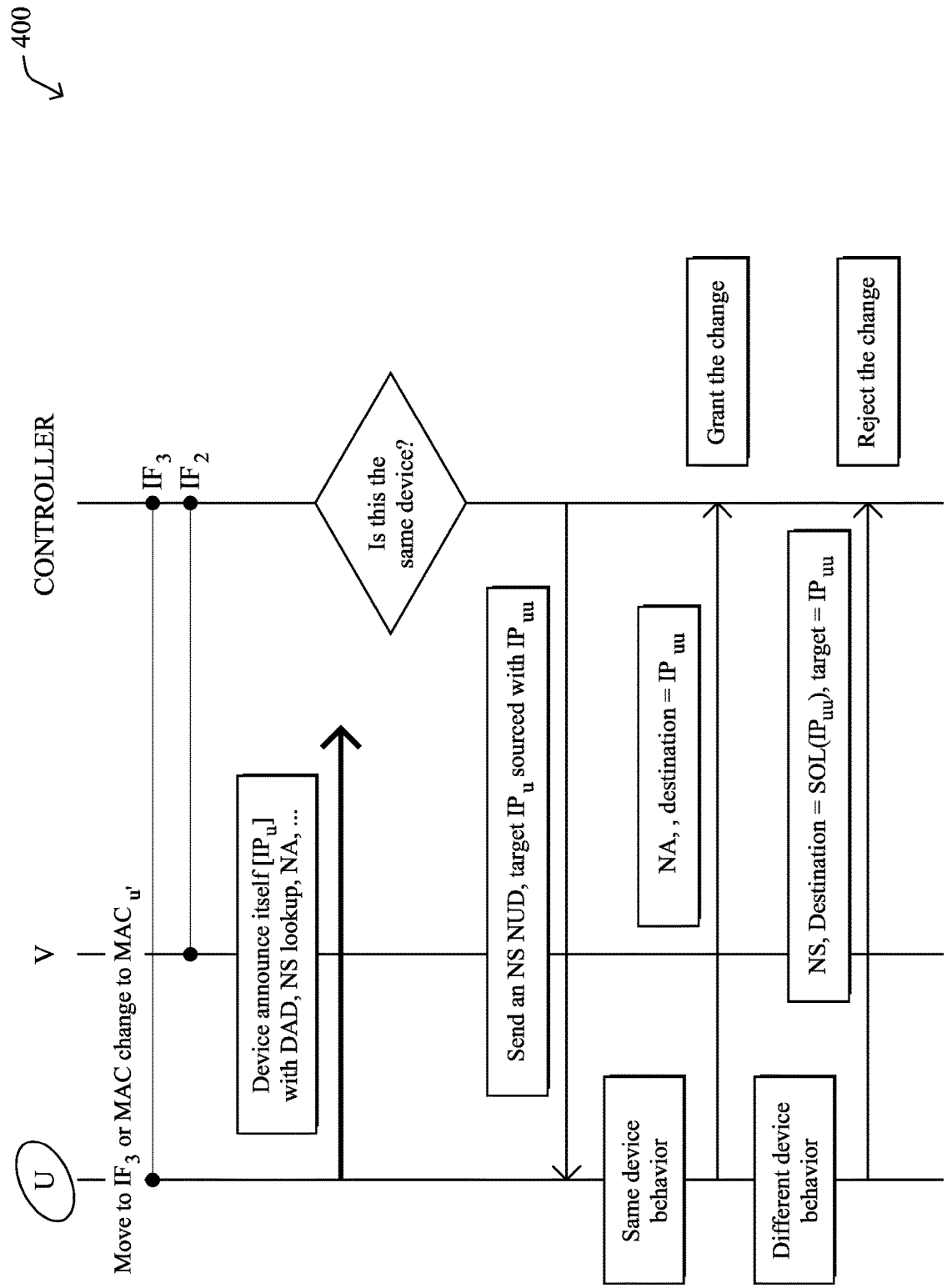
FIG. 4 illustrates an example validation component of network device movement validation.

The techniques herein, therefore, propose performing the sequence 400 shown in FIG. 4 to validate the connected device. In particular, if device U "re-connects" to the network (e.g., another device having a same anchor/IP address as a previous device but a different variable/MAC address), such as on interface $IF_3$ then the controller/tracking device needs to determine if $IP_U$ is the same device as the previous instance of $IP_U$. According to the techniques herein, therefore, the controller returns an NS NUD message targeted to the new $IP_U$ device, sourced with the $IP_{UU}$ address that was previously sent to the original $IP_U$ device. In a first option, the new $IP_U$ device (e.g., same $IP_U$, different MAC address) returns a neighbor advertisement (NA) message with the destination equal to $IP_{UU}$, reflecting that the new device had already stored $IP_{UU}$ in its ND cache 246, and as such is the same device as before. (Note that at this point, the controller may grant the change in the variable/MAC address or location of the device.) Alternatively, a different device acting with $IP_U$ would not know the $IP_{UU}$ address, and thus would respond with an NS message with the destination and target as the $IP_{UU}$ address, accordingly. As such, the controller can then determine that the new device was not previously in communication with the controller, and is a new device. (In this instance, the controller may deny/reject the change in the variable/MAC address or location of the device.)

Note that in one particular embodiment, it is useful if the switch/controller can infer which device this new $IP_U$ device is (e.g., based on applications, flows, statistical methods, etc.), and simply needs to verify that inference. In this embodiment, the tracking system sends a query to the device, sourced with a specific IPv6 address that was "bound" to the original device U ($IP_{UU}$=unique to original device U). The query does not have a SLLA option so the device can only respond without an NS lookup if it has a matching entry in its ND cache 246:

If this is the same device, then the entry should be in its cache (e.g., lifetime is four hours) and it can respond right away.

If this is not the same device, then it will first have to perform an address resolution (for $IP_{UU}$ in this example). Therefore the device tracking system will know it's not the same.

In an alternative embodiment, it may be useful to determine which device the newly connected device is (having $IP_U$) without any other clue. As such, the tracking system sends a query to the device, sourced with a common IPv6 address $IP_{UU}$ that is "bound" to all the devices ($IP_{UU}$=shared by all devices), where a different fake MAC address is used as the SLLA as a unique identifier for each device (e.g., $MAC_E$=unique to original device U). Again, the query does not have an SLLA option so the device can only respond without an NS lookup if it has a matching entry in its ND cache:

If this is a tainted device, then the entry should be in its cache and it can respond right away. The controller/switch intercepts the packet at layer 2 and checks the destination MAC address. The MAC that it uses as destination is the one that was associated to the common IPv6 address in the device ND cache, it was constructed to be unique per device, so it identifies the device.

If this is not a tainted device, then it will first have to perform an address resolution (for $IP_{UU}$ in this example). Therefore the device tracking system will know it is a new device being attached to the network.

Figure 5:
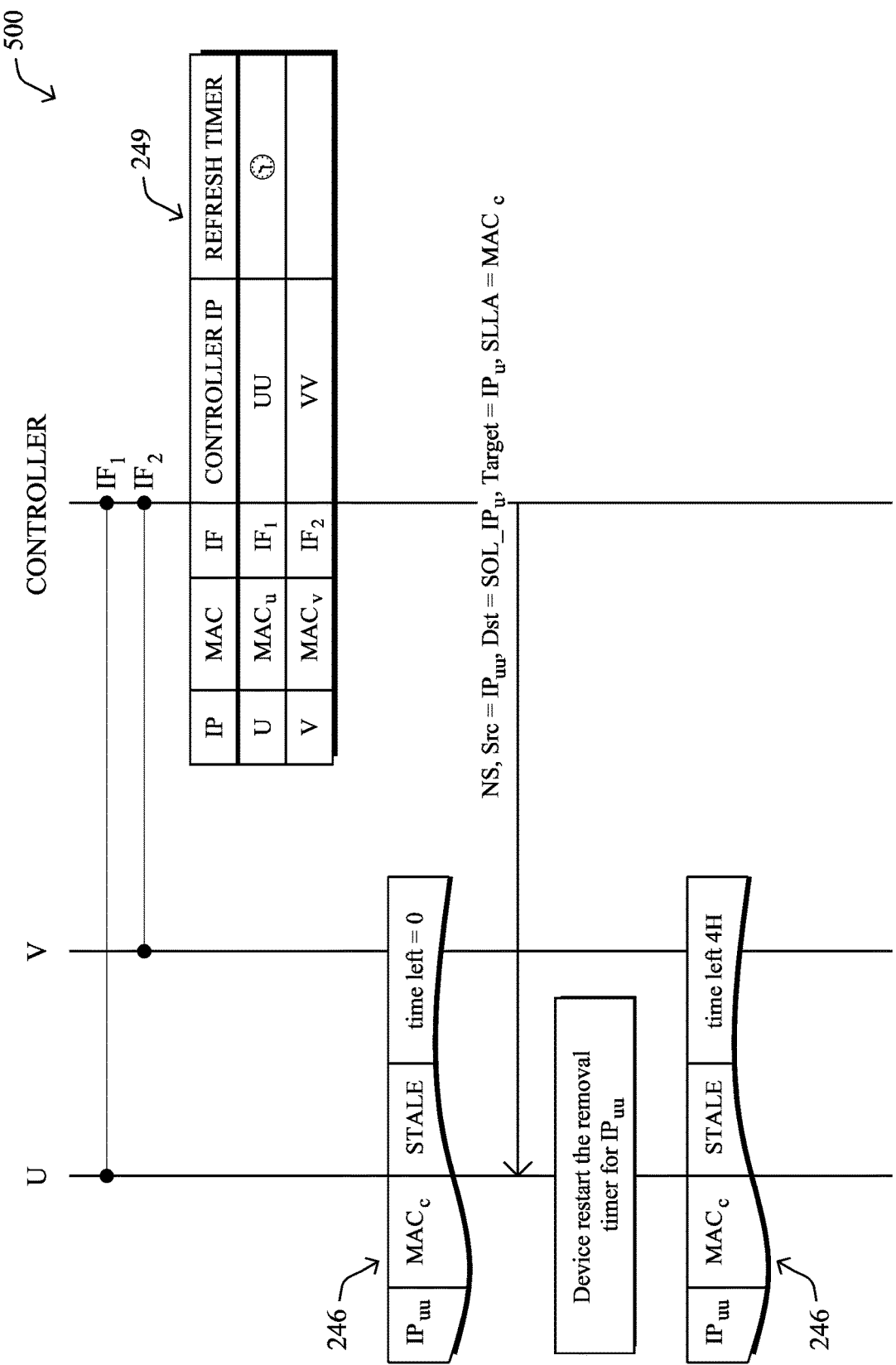
FIG. 5 illustrates an example setup refresh for network device movement validation.

Note that in one embodiment, since after some given time period (e.g., four hours), the entry $IP_{UU}$ will be removed from device caches. The tracking system herein can thus anticipate this removal and send a new/refreshing NS+SLLA message to the device so that the entry remains in the cache as long as needed. This is shown in the illustrative sequence 500 in FIG. 5.

Note that as described above, if the device sources with the same MAC, and a different IP, the techniques above may still be applied. In this instance, the MAC will be used as the anchor (the key) to retrieve the IP bound to the device ($IP_{UU}$). As such, the techniques herein may also work in the cases where:

the device is using the same MAC, different IP, and different location;

the device is using the same IP, different MAC, and different location; and if only one device can be attached to the location (for instance a plug in a wall or a particular physical port), then where the device is using a different IP, different MAC, and same location.

Note also that the techniques herein also work for wireless devices attaching to APs.

Figure 6:
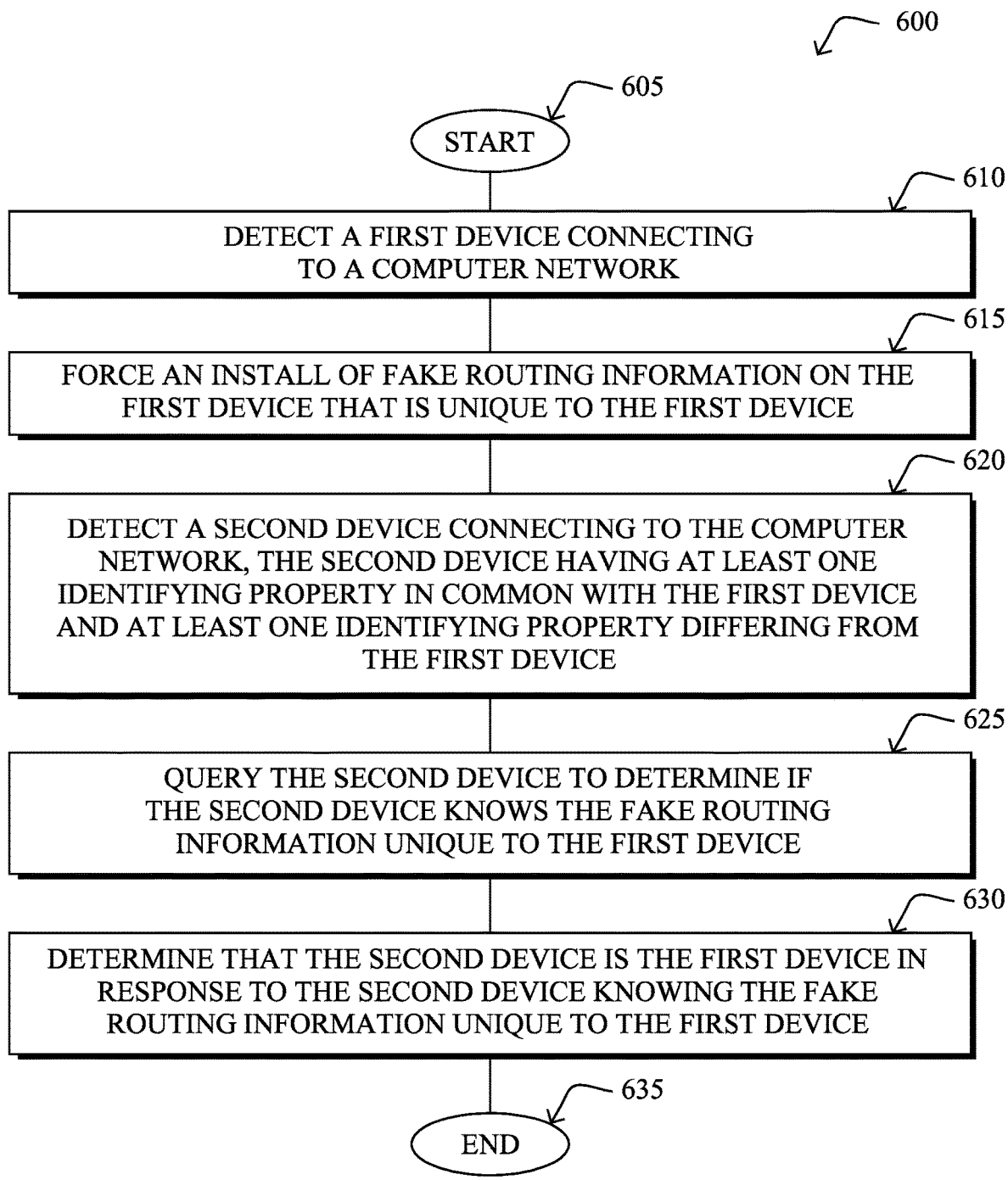
FIG. 6 illustrates an example simplified procedure for network device movement validation.

FIG. 6 illustrates an example simplified procedure for network device movement validation in accordance with one or more embodiments described herein. The procedure 600 may start at step 605, and continues to step 610, where, as described in greater detail above, a tracking device detects a first device connecting to a computer network. In step 615, then the tracking device forces an install of fake routing information on the first device that is unique to the first device. Accordingly, upon detect a second device connecting to the computer network in step 620, where the second device has at least one identifying property in common with the first device and at least one identifying property differing from the first device (e.g., one or more of an IP address, MAC address, and a physical location), then in step 625 the tracking device may query the second device to determine if the second device knows the fake routing information unique to the first device. According to the techniques herein, therefore, the tracking device may then determine, in step 630, that the second device is the first device in response to the second device knowing the fake routing information unique to the first device. Note that as described above, the fake routing information in one particular embodiment may comprise a fake IP address shared by all devices and a fake MAC address unique to the first device, such that the tracking device can correlate the second device as the first device based on the fake MAC address unique to the first device being in the response received from the second device. The illustrative simplified procedure 600 may then end in step 635.

Figure 7:
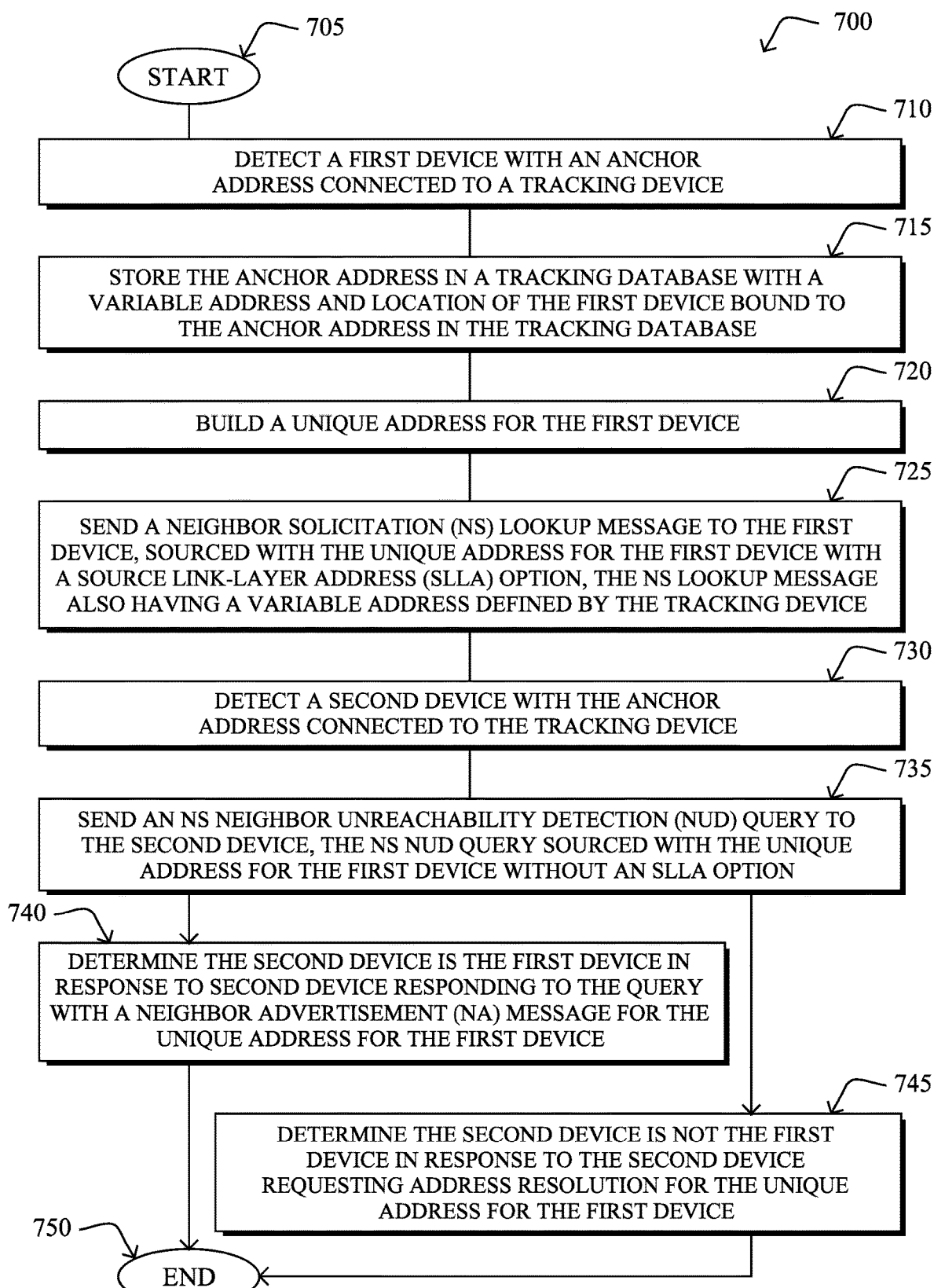
FIG. 7 illustrates another example simplified procedure for network device movement validation, particularly with reference to a particular embodiment of the network device movement validation.

In addition, FIG. 7 illustrates another example simplified procedure for network device movement validation in accordance with one or more embodiments described herein, particularly with reference to a particular embodiment of the network device movement validation. The procedure 700 may start at step 705, and continues to step 710, where, as described in greater detail above, a tracking device detects a first device with an anchor address connected to the tracking device. In response, in step 715 the tracking device stores the anchor address in a tracking database 249 with a variable address and location of the first device bound to the anchor address in the tracking database. (Note that as mentioned above, the anchor address is one of either an IP address or a MAC address, and as such, the variable address would be an opposing one of either a MAC address or an IP address, respectively.) In step 720 the tracking device builds a unique address for the first device, which may either be only for the first device (e.g., is a function of the anchor address of the first device) or may be shared for all devices in the network (e.g., defining the variable address as a fake variable address unique to the first device, as described above, and used further below). Next, in step 725, the tracking device sends a neighbor solicitation (NS) lookup message to the first device, the NS lookup message sourced with the unique address for the first device with a source link-layer address (SLLA) option and a variable address defined by the tracking device. As mentioned above, the first device is configured to enter the unique address and the variable address into its neighbor discovery database 246. Optionally, step 725 may be repeated periodically to refresh the NS lookup message, ensuring that the unique address and the variable address remain entered in the neighbor discovery database of the first device.

In response to detecting a second device with the anchor address connected to the tracking device in step 730, the tracking device may send, in step 735, an NS neighbor unreachability detection (NUD) query to the second device, the NS NUD query sourced with the unique address for the first device without an SLLA option. Now, the tracking device may either determine, in step 740, that the second device is the first device in response to the second device responding to the query with a neighbor advertisement (NA) message for the unique address for the first device, or else may determine, in step 745, that the second device is not the first device in response to the second device requesting address resolution for the unique address for the first device. Note that in step 740, in response to the second device being the first device, the tracking device may be able to identify the first device in one particular embodiment based on the fake variable address being unique to the first device being contained within the NA message response received from the second device, as detailed above. The illustrative procedure 700 may then end in step 750.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for network device movement validation. In particular, the techniques herein enable recognizing a device through its changes of MAC address and/or IPv6 address, which are being introduced for various reasons (e.g., privacy of otherwise). Note that when a change has been detected (IP, MAC, or point of attachment), current methods for validating that the change should be reflected in the tracking database is to poll the old address or old location. For constrained devices, this polling may be very harmful, if they indeed have not changed their address or location, and this is would become a way to attack a sensor. The techniques herein, therefore, allow the tracking system to refrain from "testing" the old address/location, and yet verify the validity of the new address/location entirely with a polling of the new address/location.

While there have been shown and described illustrative embodiments that provide for network device movement validation, it is to be understood that various other adaptations and modifications may be made within the spirit and scope of the embodiments herein. For example, the embodiments have been shown and described herein with relation to IP networks, and for devices with IP and MAC addresses. However, the embodiments in their broader sense are not as limited, and may, in fact, be used with other types of network protocols. In addition, while certain example embodiments are shown, such as IoT, other suitable environments may use the techniques herein, accordingly.

In addition, while certain specific embodiments of the techniques are described above, other embodiments may also be contemplated, such as where wireless devices are required to perform a "DNA" operation, where they ping (e.g., Router Solicitation, RS, unicast) their previous default router when they wake up on a potentially same link. In particular, in such an embodiment, a variation of the techniques above is to thus have the router (e.g., not the switch) perform the identity check. That is, the router would always answer (Router Advertisement, RA) unicast to the hosts, and it would present (as its own) a new address to each node. When the node wakes up, it would send an RS to that address since it is its previous router, which would then identify the node, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, by a tracking device, a first device connecting to a computer network;
   building, by the tracking device, fake routing information that is a unique address among addresses built by the tracking device, wherein the fake routing information is owned by the tracking device and used to detect when the first device changes at least one identifying property associated with the first device;
   forcing, by the tracking device, an install of the fake routing information by the first device using a neighbor solicitation lookup message that causes entry of the fake routing information into a cache of the first device, wherein installation of the fake routing information is unique to the first device;
   detecting, by the tracking device, a second device connecting to the computer network, the second device having at least one identifying property in common with the first device and at least one identifying property differing from the first device;
   querying, by the tracking device, the second device to determine if the second device knows the fake routing information unique to the first device; and
   determining that the second device is the first device in response to the second device knowing the fake routing information unique to the first device.

2. The method as in claim 1, wherein:
   a) detecting the first device comprises:
      detecting the first device with an anchor address connected to the tracking device; and
      storing the anchor address in a tracking database of the tracking device with a variable address and location of the first device bound to the anchor address in the tracking database;
   b) forcing comprises:
      building the unique address for the first device; and
      sending the neighbor solicitation (NS) lookup message to the first device, the NS lookup message sourced with the unique address for the first device with a source link-layer address (SLLA) option, the NS lookup message also having a variable address defined by the tracking device, wherein the first device is configured to enter the unique address and the variable address in a neighbor discovery database of the first device;
   c) detecting the second device comprises:
      detecting the second device with the anchor address connected to the tracking device;
   d) querying comprises:
      sending an NS neighbor unreachability detection (NUD) query to the second device, the NS NUD query sourced with the unique address for the first device without an SLLA option; and
   e) determining comprises:
      determining the second device is the first device in response to the second device responding to the query with a neighbor advertisement (NA) message for the unique address for the first device; and determining the second device is not the first device in response to the second device requesting address resolution for the unique address for the first device.

3. The method as in claim 1, wherein the identifying property is one or more of an internet protocol (IP) address, a media access control (MAC) address, and a physical location.

4. The method as in claim 1, wherein the fake routing information comprises a fake internet protocol (IP) address shared by all devices and a fake media access control (MAC) address unique to the first device, the method further comprising:
receiving a response to the query from the second device with the fake MAC address unique to the first device; and
correlating the second device as the first device based on the fake MAC address unique to the first device being in the response.

5. An apparatus, comprising:
one or more network interfaces to communicate within a computer network;
a processor coupled to the network interfaces and adapted to execute one or more processes; and
a memory configured to store a process executable by the processor, the process when executed operable to:
detect a first device connecting to the computer network;
build fake routing information that is a unique address among addresses built by a tracking device, wherein the fake routing information is owned by the tracking device and used to detect when the first device changes at least one identifying property associated with the first device;
force an install of the fake routing information by the first device using a neighbor solicitation lookup message that causes entry of the fake routing information into a cache of the first device, wherein installation of the fake routing information, wherein installation of the fake routing information is unique to the first device;
detect a second device connecting to the computer network, the second device having at least one identifying property in common with the first device and at least one identifying property differing from the first device;
query the second device to determine if the second device knows the fake routing information unique to the first device; and
determine that the second device is the first device in response to the second device knowing the fake routing information unique to the first device.

6. The apparatus as in claim 5, wherein:
a) the process when executed to detect the first device first is further operable to:
detect the first device with an anchor address connected to the tracking device; and
store the anchor address in a tracking database of the tracking device with a variable address and location of the first device bound to the anchor address in the tracking database;
b) the process when executed to force is further operable to:
build a unique address for the first device; and
send the neighbor solicitation (NS) lookup message to the first device, the NS lookup message sourced with the unique address for the first device with a source link-layer address (SLLA) option, the NS lookup message also having a variable address defined by the tracking device, wherein the first device is configured to enter the unique address and the variable address in a neighbor discovery database of the first device;
c) the process when executed to detect the second device is further operable to:
detect the second device with the anchor address connected to the tracking device;
d) the process when executed to query is further operable to:
send an NS neighbor unreachability detection (NUD) query to the second device, the NS NUD query sourced with the unique address for the first device without an SLLA option; and
e) the process when executed to determine is further operable to:
determine the second device is the first device in response to the second device responding to the query with a neighbor advertisement (NA) message for the unique address for the first device; and
determine the second device is not the first device in response to the second device requesting address resolution for the unique address for the first device.

7. The apparatus as in claim 5, wherein the identifying property is one or more of an internet protocol (IP) address, a media access control (MAC) address, and a physical location.

8. The apparatus as in claim 5, wherein the fake routing information comprises a fake internet protocol (IP) address shared by all devices and a fake media access control (MAC) address unique to the first device, and wherein the process when executed is further operable to:
receive a response to the query from the second device with the fake MAC address unique to the first device; and
correlate the second device as the first device based on the fake MAC address unique to the first device being in the response.

9. A method, comprising:
in response to detecting a first device of a computer network with an anchor address connected to a tracking device:
storing, by the tracking device, the anchor address in a tracking database with a variable address and location of the first device bound to the anchor address in the tracking database;
building, by the tracking device, a unique address for the first device, wherein the unique address is a fake variable address unique to the first device that defines the variable address; and
sending, from the tracking device, a neighbor solicitation (NS) lookup message to the first device, the NS lookup message sourced with the unique address for the first device with a source link-layer address (SLLA) option, the NS lookup message also having a variable address defined by the tracking device, wherein the NS lookup message causes the first device to enter the unique address and the variable address into a cache of the first device; and
in response to detecting a second device with the anchor address connected to the tracking device:
sending, from the tracking device, an NS neighbor unreachability detection (NUD) query to the second device, the NS NUD query sourced with the unique address for the first device without an SLLA option;

determining the second device is the first device in response to the second device responding to the query with a neighbor advertisement (NA) message for the unique address for the first device; and determining the second device is not the first device in response to the second device requesting address resolution for the unique address for the first device.

10. The method as in claim 9, wherein the unique address for the first device is only for the first device and is a function of the anchor address of the first device.

11. The method as in claim 9, wherein the unique address for the first device is shared for all devices in the computer network, the method further comprising:

in response to the second device being the first device, identifying the first device based on the fake variable address unique to the first device from the NA message response from the second device.

12. The method as in claim 9, further comprising:

refreshing the NS lookup message to ensure the unique address and the variable address remain entered in the cache of the first device.

13. The method as in claim 9, wherein the anchor address is one of either an internet protocol (IP) address or a media access control (MAC) address, and wherein the variable address is an opposing one of either a MAC address or an IP address, respectively.

14. The method as in claim 9, wherein the unique address for the first device is an internet protocol version 6 (IPv6) address.

15. An apparatus, comprising:

one or more network interfaces to communicate as a tracking device within a computer network;

a processor coupled to the network interfaces and adapted to execute one or more processes; and a memory configured to store a process executable by the processor, the process when executed operable to:
  a) detect a first device with an anchor address connected to the tracking device;
  b) in response to detecting the first device:
    store the anchor address in a tracking database with a variable address and location of the first device bound to the anchor address in the tracking database;
    build a unique address for the first device, wherein the unique address is owned by the tracking device, wherein the unique address is a fake variable address unique to the first device that defines the variable address; and
    send a neighbor solicitation (NS) lookup message to the first device, the NS lookup message sourced with the unique address for the first device with a source link-layer address (SLLA) option, the NS lookup message also having a variable address defined by the tracking device, wherein the NS lookup message causes the first device to enter the unique address and the variable address into a cache of the first device;
  c) detect a second device with the anchor address connected to the tracking device; and
  d) in response to detecting the second device:
    send an NS neighbor unreachability detection (NUD) query to the second device, the NS NUD query sourced with the unique address for the first device without an SLLA option;
    determine the second device is the first device in response to the second device responding to the query with a neighbor advertisement (NA) message for the unique address for the first device; and
    determine the second device is not the first device in response to the second device requesting address resolution for the unique address for the first device.

16. The apparatus as in claim 15, wherein the unique address for the first device is only for the first device and is a function of the anchor address of the first device.

17. The apparatus as in claim 15, wherein the unique address for the first device is shared for all devices in the network; and wherein the process when executed is further operable to:

in response to the second device being the first device, identify the first device based on the fake variable address unique to the first device from the NA message response from the second device.

18. The apparatus as in claim 15, wherein the process when executed is further operable to:

refresh the NS lookup message to ensure the unique address and the variable address remain entered in the cache of the first device.

19. The apparatus as in claim 15, wherein the anchor address is one of either an internet protocol (IP) address or a media access control (MAC) address, and wherein the variable address is an opposing one of either a MAC address or an IP address, respectively.

20. The apparatus as in claim 15, wherein the unique address for the first device is an internet protocol version 6 (IPv6) address.

* * * * *

UNITED STATES PATENT AND TRADEMARK OFFICE
CERTIFICATE OF CORRECTION

PATENT NO. : 10,911,400 B2
APPLICATION NO. : 15/156571
DATED : February 2, 2021
INVENTOR(S) : Eric Levy-Abegnoli et al.

Page 1 of 1

It is certified that error appears in the above-identified patent and that said Letters Patent is hereby corrected as shown below:

In the Specification

Column 7, Line 43, please amend as shown:
address space to do this), $IP_{UU}=f(IP_U)$. It will then send a Column 9, Line 19, please replace as shown:
$MAC_C$=unique to original device U). Again, the query does Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*